July 10, 1962   A. G. OLSCHESKE   3,043,266
ADJUSTABLE CONTACT MEMBER
Filed Feb. 27, 1961
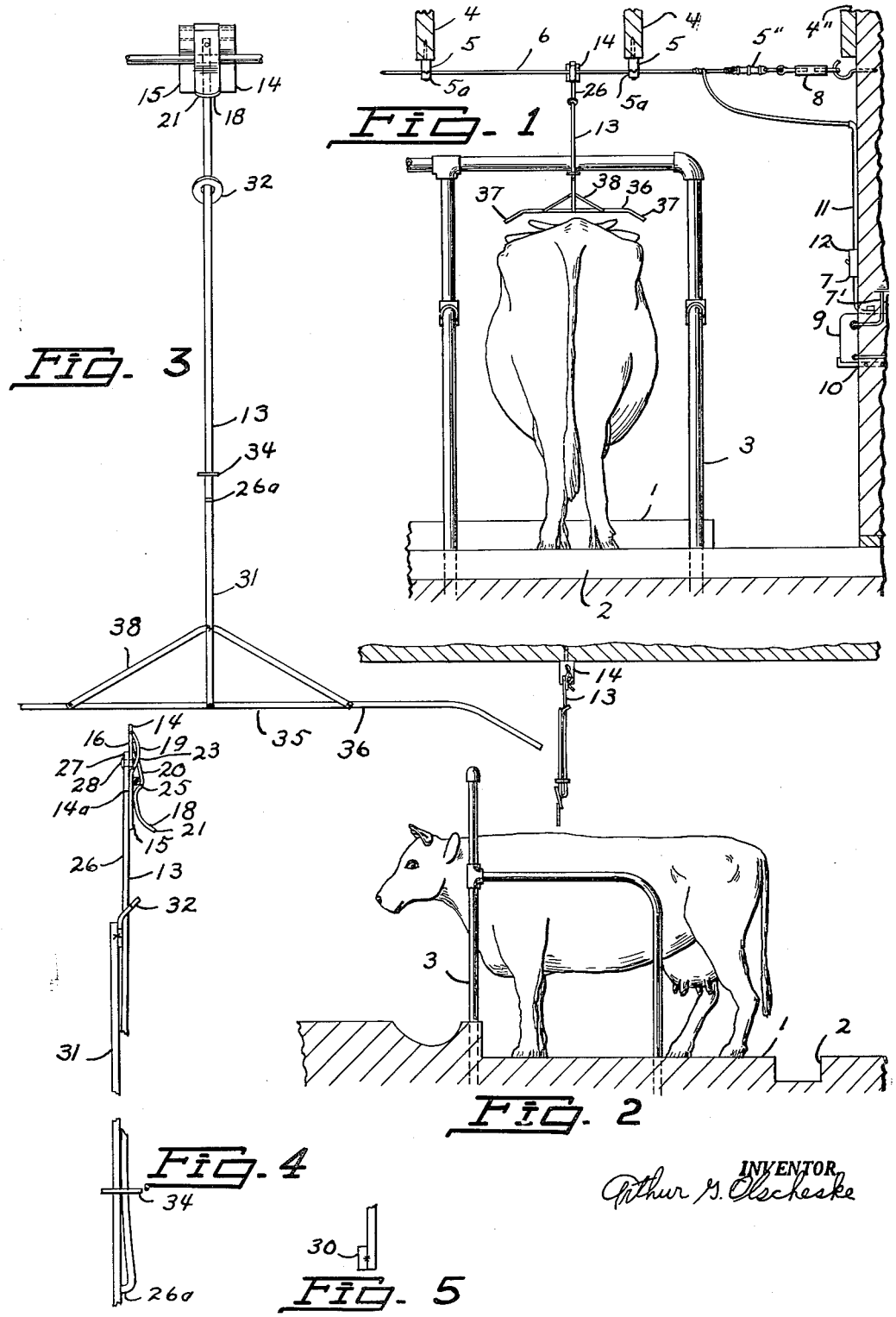
INVENTOR
Arthur G. Olscheske

United States Patent Office 3,043,266
Patented July 10, 1962

3,043,266
ADJUSTABLE CONTACT MEMBER
Arthur G. Olscheske, Box 147, New Lisbon, Wis.
Filed Feb. 27, 1961, Ser. No. 91,701
2 Claims. (Cl. 119—27)

This invention relates to improvements in an electrical system for use in cattle stalls and is particularly directed to improvements in vertical depending members.

Primarily, it is an object of this invention to provide a simple and practical device to insure deposit of droppings from the cattle into a gutter provided at the rear of the stalls thereby maintaining a greater degree of cleanliness of the cattle and the stalls.

More specifically, this invention is an improvement in an electrical system directed to adjustable contact members installed in each stall whereby the back of the animal touches the contact just before evacuation, thereby causing the animal to step back in the direction of the gutter to deposit the droppings in the gutter.

Another object of this invention is to provide an adjustable contact member which in itself is comparatively economical to build and assemble, ingenious in the arrangement of parts to insure a device which is easily plated for insuring a rust proof assembly.

Additional objects, advantages and features of invention will be apparent from the following description considered in conjunction with the accompanying drawing wherein:

FIGURE 1 is a rear elevation of a portion of a cattle barn having my system installed.

FIGURE 2 is a side elevation thereof.

FIGURE 3 is a front view of the adjustable contact member.

FIGURE 4 is a view at right angles thereto.

FIGURE 5 is a detailed modification of the lower end of one of the contact members.

Referring to the drawings, attention is directed to FIGURES 1 and 2 wherein a portion of a cattle barn is shown including a stall 1 to the rear of which there is formed a disposal gutter 2. The stall 1, of which only one is illustrated, is defined by individual stanchions 3 together with the usual confining means to permit the cattle to move forwardly and backwardly, or to lie down in the stall.

In the rafters 4 of the barn structure respective insulators 5 are secured for support of a non-insulated wire 6, one terminal end of which is anchored to an insulator 5' secured in an end rafter 4', and grounded at 7. As shown in FIGURE 1, the other end of the wire is secured to an insulator 5", which in turn is connected to a turnbuckle 8 anchored to an end rafter 4". With the wire loosely engaged in the insulators 5, the turn buckle may be actuated to properly tension the wire 6, after which the caps 5a of the insulators may be tightened to secure the wire at the proper tension for support of contact members presently to be described.

Upon a convenient wall of the barn there is mounted a transformer 9 connected to a suitable source of electrical energy by a lead 10. From the transformer 9 a lead 11 is extended and electrically connected to the wire 6, and in the lead 11 a switch 12 is installed.

The lead 11 and lead 7' of the ground wire are insulated. Supported from the wire 6 and electrically connected therewith a plurality of contact members 13 are positioned, each being disposed so as to normally occupy a location centrally of each stall and at a suitable vertical height.

Cattle vary in size and particularly in height, and it is therefore necessary that the contact members may be adjusted to each individual animal, the animals occupying the same stall over a period of time. It is therefore only necessary to make one adjustment of the contact member for a given animal.

For an understanding of the construction of the contact members, attention is invited to FIGURES 3 to 5, inclusive. A bracket 14 is employed to fasten directly to the wire 6. This bracket is formed primarily from a flat piece of spring steel 15 having a leaf or tongue 16 struck therefrom. A finger actuated latch 18 is formed primarily from another piece of substantially flat spring steel. This latch comprises a T-shaped head 19, a stem 20 projecting outwardly therefrom and a finger contacting member 21, integral with said stem and formed in the shape of a U as designated by the numeral 22.

The head 19 is disposed between the end members 23 and the leaf 16 with the stem 20 projecting between the members 23. These members 23 are of the same width and length and have the leaf 16, disposed therebetween. Each member 23 is arced or curved adjacent the free end and arcs away from and then inward toward the leaf. The wire 16 is first positioned within the curved area 25 of the finger portion 21 and when the finger grip is pushed down the wire is gripped firmly between the face 14a of the bracket leaf 16 and finger latch.

The wire engaging portion of the bracket is actually up side down relative to the general use a bracket of this kind is originally used for. This is to insure that regardless of sideways movement, the bracket can never become disengaged from the wire.

A rod 26 is pivotally mounted at one end 27 to the leaf 16 by a rivet 28, or a cotter pin, and depends downwardly from the bracket 14. The advantage of pivotally mounting the rod 26 to the bracket enables the rod 26 to move sideways if occasion so demands. An additional advantage of pivotally mounting the rod 26 to the bracket 14 with a rivet or cotter pin provides means to quickly separate the rod from the bracket. This is distinct and novel in that the parts may be plated and then put together without the necessity of welding some parts after the unit is put together. In this connection, it is imperative that the plating is never destroyed otherwise rust readily accumulates with a resultant loss in proper conduction. In prior devices, rust has proven a serious barrier to effective operation and has always been present through the very nature of the manner of assembly.

The lower end 26a of the rod is bent at approximately right angles to the main body of the rod. In the modification in FIGURE 5, a separate block 30 is secured to the face of the rod 26. The purpose of the foregoing constructions will be explained later.

A second rod 31, similar in shape to rod 26, has an eyelet 32 secured adjacent the top end. The rod 26 being threaded through said eyelet 32 when the device is assembled. Both rods 26 and 31 depend downwardly in interconnected adjusted relationship by a washer 34 which encircles both rods.

Secured to the lower end of rod 31 is a cow contacting member 35 which comprises a horizontally extending bar 36 bent at both ends 37 to cover the back of the cow when said cow humps its back prior to evacuation. The peculiar advantage in providing the bent ends 37 is to maintain contact with the cow regardless of the fact that the cow shifts sideways wherein the rods pivot on the rivet or cotter pin. A bowed strengthening member 38 is secured to the rod 31 and adjacent the ends.

In operation, the bracket 14 is secured to the wire 6 with the rods 26 and 31 depending downwardly thereto. The washer 34 is moved upwardly so that the rods 26 and 31 are loosely mounted. The rod 31 and accordingly, the bar 36 is lowered to a position whereby the cow in the stall will touch the bar when said cow humps its back. The contact members will be located in a forward position within the stall so that contact with the bar will be at a forward portion of the animal normally. Normally, the cow cannot contact the bar 36, but in the act of evacuation, the back of the cow is humped into engagement with the bar 36, whereupon a slight electrical shock will cause the animal to back from the stall the necessary distance and thus maintain the stall in a clean condition.

The inside diameter of the washer is less than the thickness of the rods and block 30 or extension combined, whereby as the washer is moved downwardly, the washer locks the rods in position. The block or extension forms an abutment between the rods.

Having thus described my invention, what I claim is:

1. The combination is a contact member for use in an animal stall including a suspension bracket, a bare electric wire, said bracket held temporarily and in rigid relationship to said wire, a rod suspended from said bracket and removably mounted thereon in swinging relationship, a second rod, said second rod having an eyelet member secured at one end thereof, said first rod threaded through said eyelet, said rods depending downwardly adjacent to each other, a washer encircling said rods, an abutment formed at the free end of said first rod and between said rods to keep said rods separated, said washer having an inside diameter less than the combined thickness of said rods and said abutment whereby in one position said first rod may slide freely through said eyelet and in another position said rods are held in vertically adjustable position.

2. The combination in a contact member for use in an animal stall including a suspension bracket, a bare electric wire, said bracket held temporarily and in rigid relationship to said wire, a rod suspended from said bracket and removably mounted thereon in swinging relationship, a second rod, said second rod having an eyelet member secured at one end thereof, said first rod threaded through said eyelet, said rods depending downwardly adjacent to each other, a washer encircling said rods, an abutment formed at the free end of said first rod and between said rods to keep said rods separated, said washer having an inside diameter greater than the combined thickness of said rods but less than the combined thickness of said rods and said abutment whereby in one position said first rod may slide freely through said eyelet and in another position said rods are held in vertically adjustable position, the lower end of said rod including a horizontally extending bar bent at both ends and a bowed strengthening member secured to said second rod and adjacent said last named ends.

References Cited in the file of this patent

UNITED STATES PATENTS

| | | |
|---|---|---|
| 2,428,875 | Hantz | Oct. 14, 1947 |
| 2,790,416 | Klinzing | Apr. 30, 1957 |